Sept. 23, 1958  R. HELMERT  2,853,600
SUPERVISORY CONTROL CIRCUIT
Filed March 10, 1955
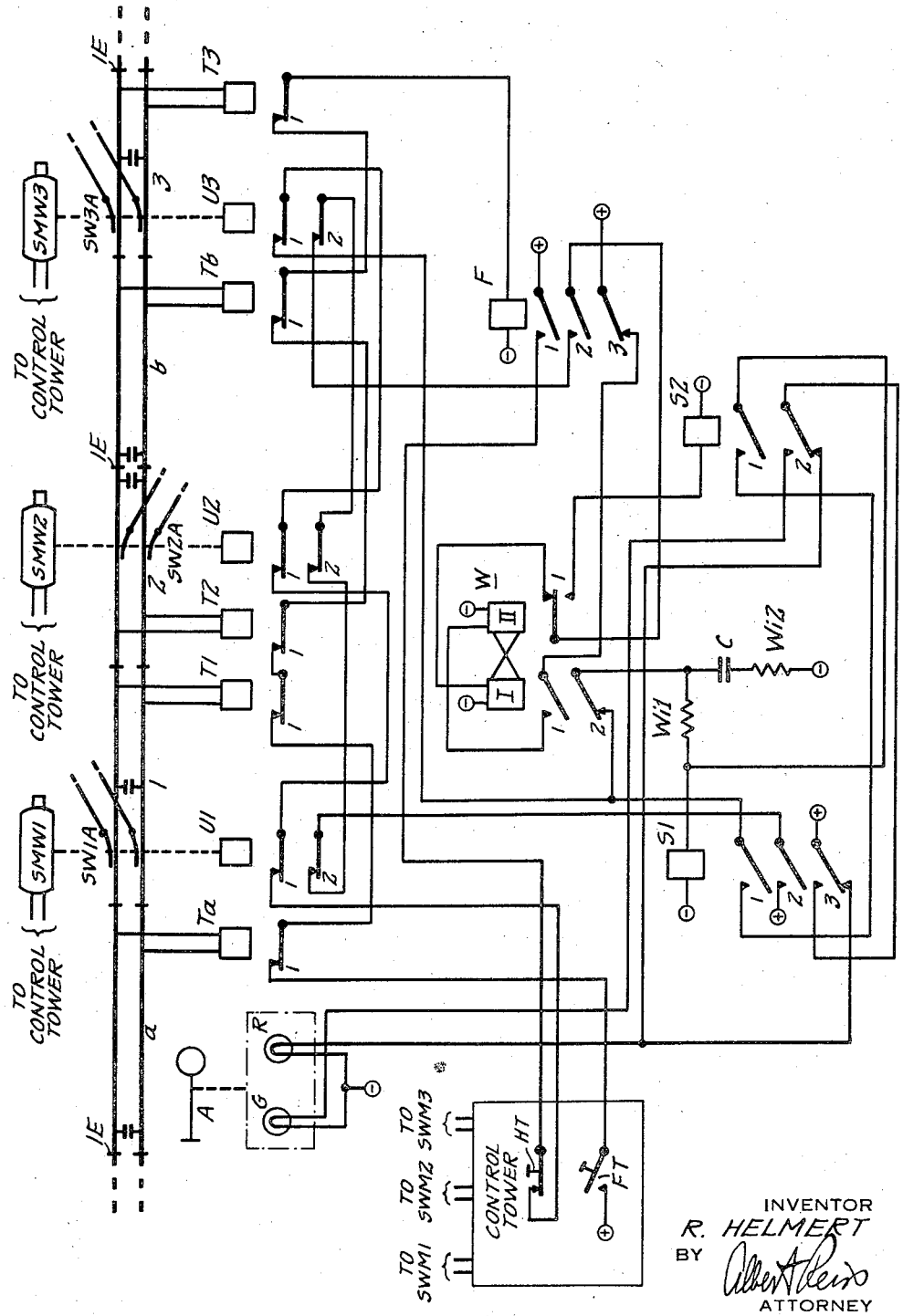
INVENTOR
R. HELMERT
BY
ATTORNEY United States Patent Office 2,853,600
Patented Sept. 23, 1958

2,853,600

SUPERVISORY CONTROL CIRCUIT

Robert Helmert, Stuttgart, Germany, assignor to International Standard Electric Corporation, New York, N. Y., a corporation of Delaware Application March 10, 1955, Serial No. 493,473

2 Claims. (Cl. 246—134)

This invention relates to improvements in railway signalling circuits, and more particularly to an improved circuit which will prevent spurious operation of a pair of supervisory circuits which supervise the setting up and release of said route where a faulty electrical connection exists in either of said supervisory circuits.

In conventional circuit arrangements, provision is usually made for the release of a selected route only in the event that no faulty connections exist, and should a faulty connection exist, the release of the route is retarded and remains locked and the clear-light signal at the trackside is prevented from being lit.

This invention aims to prevent spurious operation of supervisory switching equipment in the event that a fault exists between two supervisory circuits allocated to the control of such equipment.

Track supervisory relays, track repeater system, signal setters and similar switching means whose circuits include the proper position of points (switches) and/or the clearance of track sections of a route and whose position or clearance, respectively must be supervised, are adapted to be improved by this invention, and the position or clearance of same may be made to occur despite a faulty connection.

Accordingly, it is an object of this invention to prevent operation of supervisory switching equipment where a circuit fault exists.

It is a further object of the invention to prevent lighting of a clear signal unless two supervisory circuits controlling said signal are free from electrical faults.

According to another aspect of the invention, at least two of the supervisory or signal setting relays respectively, which are assigned to one route are provided with different operating times.

By the term "fault" it is to be understood that two wires or conductors of a cable or in a relay rack and which are normally supposed to remain insulated from each other, may become shorted and establish a conductive connection therebetween. Similarly, a short circuit of one or the other of the relays involved in the circuit may occur and it would therefore be possible for a relay to be energised which is normally supposed to be maintained in a de-energised position and it is also possible that relay contacts might become accidentally bridged although they are intended to normally remain open.

The above-mentioned and other features and objects of this invention and the manner of attaining them will become more apparent and the invention itself will be best understood by reference to the following description of an embodiment of the invention taken in conjunction with the accompanying drawing, which includes a diagrammatic representation of a track layout and a schematic diagram of a portion of the supervisory equipment associated with the layout with so much of the route setting equipment as is necessary to properly illustrate the invention.

Referring now to the drawing, a track diagram is diagrammatically shown including a track TR1 extending from the signal A on the left and which includes a route from said signal SW over to the switch 3A on the right. The route is made up of a plurality of track sections separated by track insulating elements 1E at intervals therealong. Track switches SW1A, SW2A and SW3A are adapted to selectively switch trains from track TR1 to different tracks (not shown) by means of their associated switch machines SWM1 . . . SWM3 respectively, operated under control of the operator at the remote control tower. The portion of track between signal A and switch 1A is designated "a" and the track portion between switch 3A and the rightmost insulator 1E is designated "b." The intervening track sections are designated "1" and "2," and the track section to the right of switch SW3A is designated "3."

Each of the track switches has associated therewith a position-repeating relay U1, U2 and U3, and which relays convey information as to the condition of or position of its associated track switch. Thus a repeater relay U will assume an energised position for the straight or plus position of a track switch and a de-energised position for the turnout or minus position of the track switch. It could be arranged to reverse the position of the switch with respect to the position of the relay without deviating from the principles of my invention.

In the circuit shown, I also use a mechanically interlocking relay W having two windings I and II and wherein a mechanical interlocking between armatures associated with respective windings prevents both armatures from assuming fully energised or de-energised positions simultaneously. Thus, if the winding I of relay W is energised, its associated armature will assume the upper operated position and will mechanically prevent the armature associated with the winding II of the relay from simultaneously assuming the operated position. If winding II is energised its associated armature would similarly mechanically prevent the armature associated with the winding I from assuming the operated position. Upon operation of either armature, the operated armature mechanically latches and is held in operated position even though its associated winding is thereafter de-energised. Upon energisation of the opposite winding the latch is released and the other armature is operated and it, in turn, is held in a latched position by the now-released armature.

The signal A includes a red lamp R and a green lamp G respectively, and shown diagrammatically. The operation of the foregoing lamps is controlled by contacts s13 and s22 associated with the relays S1 and S2 respectively. A schematic representation of a circuit to control relays S1 and S2 is shown. Thus if it is desired to set the signal A to "line clear" position, the signal setting relays S1 and S2 will be required to operate and by their contacts s13 and s22 respectively, cause the green lamp G to become illuminated and will also cause the extinguishment of the red lamp R. The invention will therefore be described in terms of setting or operating the S1 and S2 relays and which relays may be adapted to control other equipment in addition to or in lieu of lamps G and R.

As is well known to those skilled in the art, each insulated track section has associated therewith a track relay which is normally in the energised position and, when a train is present in its corresponding track section, the relay becomes de-energised. Each of the track sections shown accordingly have associated therewith the track relays TA, T1, T2, Tb and T3, respectively. The contacts of the track relays mentioned are shown to be normally made, indicating the absence of a train in their several associated track sections. If the foregoing track sections are free of trains, the circuit will be completed for relay F as shown via: closed contacts t31, tb1, t21,

*t*11 and *t*a1, and upon the actuation of a selection key FT by an operator in a control tower. The operation of relay F will cause its associated contacts *f*1 and *f*2 to make and thereby complete an operating circuit for relay S1 via the following path: Battery, closed contact *f*1, closed button key contact HT, closed contacts *u*11, *u*21, *u*31, *w*12, resistance W*i*1, winding of relay S1 to battery. Relay S1 has associated therewith three contacts, namely, *s*11, *s*12, and *s*13. Relay S1 will not operate immediately upon the closure of contact *f*1 however, due to the delay imposed on its operating circuit by the delay network which is in shunt with the winding of S1, and which network includes resistances W*i*2, W*i*1 and the condenser C. The condenser C must first attain a predetermined degree of charge before sufficient current will pass through the winding of relay S1. The operation of relay S1 causes an operating path to be completed for the operation of repeater latching relay W via: battery, closed contacts *s*12, *u*12, *u*22, *u*32, *f*2, front transfer contact *w*III1, winding I of relay W to battery. Relay W is of the mechanically interlocked type and consists of two windings I and II, each winding having associated armatures. The armature associated with relay winding II is normally up and is latched in that position. The arrangement is such that the energization of winding I causes the mechanical latching of the armature associated with winding II to be released, and the armature associated with winding I is now pulled up and remains latched in that position awaiting the re-energization of winding II and the re-operation of its associated armature to cause its release in turn. Upon energization of winding I as aforesaid, the associated armature also causes the contact *w*I2 to open and the release of the armature associated with winding II causes the transfer contact *w*III1 associated therewith, to assume a reverse position thereby isolating the winding I from the operating path previously traced and switches the winding of relay S2 in the circuit which extends over the following path: battery, closed contacts *s*12, *u*12, *u*22, *u*32, *f*2, back transfer contact *w*III1, winding of S2 to battery. The opening of contact *w*I2 opens the previously traced path for the operation of relay S1, and while an alternative operating path through closed contacts *s*11 and *s*21 will now be made for the relay S1, there is a finite time which elapses between the opening of contact *w*I2 and the closure of contact *s*21 and during which there is no completed circuit for the relay S1. Relay S1 would normally drop off were it not for the fact that the charge in condenser C maintains the relay S1 energized until the operation of the relay S2 as mentioned above. Should the condenser C be defective however relay S1 would drop off and its contact *s*11 would open the alternative path above traced and it would not be able to re-operate. The route cannot be cleared for traffic unless both relays S1 and S2 operate since it will be observed from an examination of the drawing that if either relays S1 and S2 are unoperated, the red lamp R will be illuminated, it requiring both transfer contacts *s*13 and *s*22 to transfer if the red lamp R is to be extinguished. After the relay F is released, its back contact *f*3 will again close and assume the position shown and contact *w*I1 will be closed because it will be remembered that winding I of repeater lock W operated. Thereupon a circuit is completed for the winding II of the repeater lock relay W via the following path: battery, closed contacts *f*3, *w*I1, winding II of relay W and battery, thereby restoring the circuit to the initial position shown. Upon the energization of winding II of the repeater lock relay W, transfer contact *w*III1 will assume the position shown and contacts *w*I1 and *w*I2 will likewise assume the shown position.

The contact HT is a contact associated with a button or key used for setting the signal A to the stop position in the event that it is desired to do so manually.

Thus, relays S1 and S2 must operate in sequence with a predetermined time delay intervening therebetween and if, due to circuit fault the wrong sequence occurs, the displayed signals will so indicate. The failure of the delay network will cause relay S1 to drop off and it cannot again be re-energized until the fault is corrected. Again, both signals may be displayed indicating a fault. Should a power failure occur during the interim between the operation of winding I of relay W and S2, relay S1 will drop off because the charge in condenser C will sustain it in operation but for a relatively short time.

The relay F will drop off upon release of the route in accordance with known signalling practice.

In place of the contact *s*21 one may substitute the contacts of a clear-light supervisory relay (not shown) or of a stop-light supervisory relay (not shown) or of both, which will only be closed when these relays occupy the position which corresponds to the line clear position of the signal A. These contacts may also be arranged in such a way that the circuit of the signal setting relay is completed as soon as one of the two supervisory relays is energised and the other one is dropped off, and that the circuit will be interrupted when both relays are either energized or de-energized. They will then, at the same time, serve as release supervisors indicating the release of these relays and, in addition, effect the de-energization of the signal setting relay in the case of a longer interruption or absence of the setting or operating voltage of the signal lamps, i. e. when the duration of the power failure exceeds the delay time of the setting relay. The stop position of the signal is effected by the opening of the contacts HT. In such a case relay S1 drops off and opens its contacts S12, so that relay S2 will also drop off.

While the invention has been described with respect to the cooperation of the relays S1 and S2 in the control of lamps G and R, this example is given for explaining the operation of the invention as a matter of convenience, and the same circuitry can be used for controlling elements other than indicating lamps.

What is claimed is:

1. An arrangement for the control of a supervisory circuit in a railway signalling system comprising a plurality of track sections, each section electrically insulated from the other, movable track means, position-repeating switch means under control of said movable track means, a plurality of track relays, each operatively connected to a different one of said track sections, and adapted to detect the presence of a train therein, a signal governing access to said track sections, said signal having at least two aspects, a check relay for checking the condition of operation of said track relays, a first operating circuit for said check relay comprising a series connection among contacts of said track relays, a latching relay having a pair of windings and a pair of cooperating armatures, a pair of signal-setting relays having a plurality of contact sets, each of said setting relays adapted to control the setting of a different aspect of said signal, a delay device, a second operating circuit for a first one of said signal-setting relays comprising a series-parallel connection among said delay device and contacts of said check relay, said position-repeating switch means and a set of contacts associated with a first armature of said latching relay, a third operating circuit for the second winding of said latching relay comprising a series connection among contacts of said first signal-setting relay, said position-repeating switch means, said check relay and transfer contacts associated with the second armature of said latching relay, a fourth operating circuit for the other one of said signal-setting relays comprising a series connection among contacts of said first signal-setting relay, said position-repeating switch means, said check relay and the transfer contacts associated with the second armature of said latching relay, a fifth operating circuit for the auxiliary control of said first signal-setting relay comprising a series connection among contacts of said check relay, said position-repeating switch means, said first signal-setting relay and said second setting relay, said delay device adapted to maintain said first signal-setting relay operated during the interval said second operating circuit is interrupted at contacts of said latching relay, an energizing circuit for a first of said aspects including transfer contacts of said first signal-setting relay in a first position, an alternative operating circuit for said first aspect comprising a series connection among the transfer contacts of said first signal-setting relay in a second position and transfer contacts of said second signal-setting relay in a first position, and an operating circuit for said second aspect comprising a series connection among the transfer contacts of said first signal-setting relay in a second position and the transfer contacts of said second signal-setting relay in a second position.

2. An arrangement as claimed in claim 1, further comprising a circuit for re-setting said latch relay upon the entry of a train into one of said track sections, said reset circuit comprising a series connection between a back contact associated with said check relay and a front contact under control of the first armature of said latching relay.

References Cited in the file of this patent

UNITED STATES PATENTS

| | | |
|---|---|---|
| 2,302,006 | Coley | Nov. 17, 1942 |
| 2,302,007 | Coley | Nov. 17, 1942 |